US011720490B2

(12) United States Patent
Chen et al.

(10) Patent No.: US 11,720,490 B2
(45) Date of Patent: Aug. 8, 2023

(54) MANAGING HOST INPUT/OUTPUT IN A MEMORY SYSTEM EXECUTING A TABLE FLUSH

(71) Applicant: Micron Technology, Inc., Boise, ID (US)

(72) Inventors: Yuehhung Chen, Sunnyvale, CA (US); Chih-Kuo Kao, Fremont, CA (US); Fangfang Zhu, San Jose, CA (US); Jiangli Zhu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 70 days.

(21) Appl. No.: 17/446,519

(22) Filed: Aug. 31, 2021

(65) Prior Publication Data
US 2023/0069382 A1 Mar. 2, 2023

(51) Int. Cl.
*G06F 12/02* (2006.01)
*G06F 12/0891* (2016.01)
*G06F 3/06* (2006.01)

(52) U.S. Cl.
CPC ........ *G06F 12/0292* (2013.01); *G06F 3/0604* (2013.01); *G06F 3/0652* (2013.01); *G06F 3/0659* (2013.01); *G06F 3/0679* (2013.01); *G06F 12/0246* (2013.01); *G06F 12/0891* (2013.01); *G06F 2212/7201* (2013.01)

(58) Field of Classification Search
None
See application file for complete search history.

(56) References Cited

U.S. PATENT DOCUMENTS

| 8,838,936 | B1* | 9/2014 | Salessi | G06F 12/0246 |
| | | | | 711/3 |
| 9,262,337 | B2 | 2/2016 | Wang | |
| 2008/0140897 | A1 | 6/2008 | Ganguly | |
| 2011/0296123 | A1* | 12/2011 | Adler | G06F 11/1435 |
| | | | | 711/E12.001 |
| 2015/0143174 | A1 | 5/2015 | Adler et al. | |
| 2017/0269844 | A1* | 9/2017 | Paley | G06F 11/1446 |
| 2017/0351603 | A1* | 12/2017 | Zhang | G06F 3/0604 |
| 2020/0167095 | A1 | 5/2020 | Jung | |
| 2020/0272577 | A1* | 8/2020 | Zeng | G06F 12/1018 |
| 2020/0401481 | A1 | 12/2020 | Cariello | |

(Continued)

OTHER PUBLICATIONS

Jung et al. "Garbage Collection for Low Performance Variation in NAND Flash Storage Systems." Jan. 2015. IEEE. IEEE Transactions on Computer-Aided Design Of Integrated Circuits and Systems. Vol. 34. Pp 16-28.*

(Continued)

*Primary Examiner* — Nathan Sadler
(74) *Attorney, Agent, or Firm* — Lowenstein Sandler LLP

(57) ABSTRACT

Responsive to receiving a table flush command, a first portion of an address mapping table is identified. A first flush operation with respect to a first portion of the address mapping table is performed. Responsive to receiving at least one memory access command, flush operations for a subsequent portion of the address mapping table is suspended. At least one memory access operation specified by the at least one memory access command is performed. A second flush operation with respect to the subsequent portion of the address mapping table is performed.

20 Claims, 5 Drawing Sheets

(56) References Cited

U.S. PATENT DOCUMENTS

2021/0026548 A1\* 1/2021 Kang .................. G06F 12/0246
2021/0034536 A1\* 2/2021 Kim .................... G06F 13/1673
2021/0096778 A1\* 4/2021 Nagarajan ............. G06F 3/0656

OTHER PUBLICATIONS

PCT Notification of Transmittal of the International Search Report and the Written Opinion of the International Searching Authority for PCT Application No. PCT/US2022/042256, dated Dec. 21, 2022, 10 pages.

\* cited by examiner

MANAGING HOST INPUT/OUTPUT IN A MEMORY SYSTEM EXECUTING A TABLE FLUSH

TECHNICAL FIELD

Embodiments of the disclosure relate generally to memory sub-systems, and more specifically, relate to managing host input/output (I/O) in a memory system executing a table flush command.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
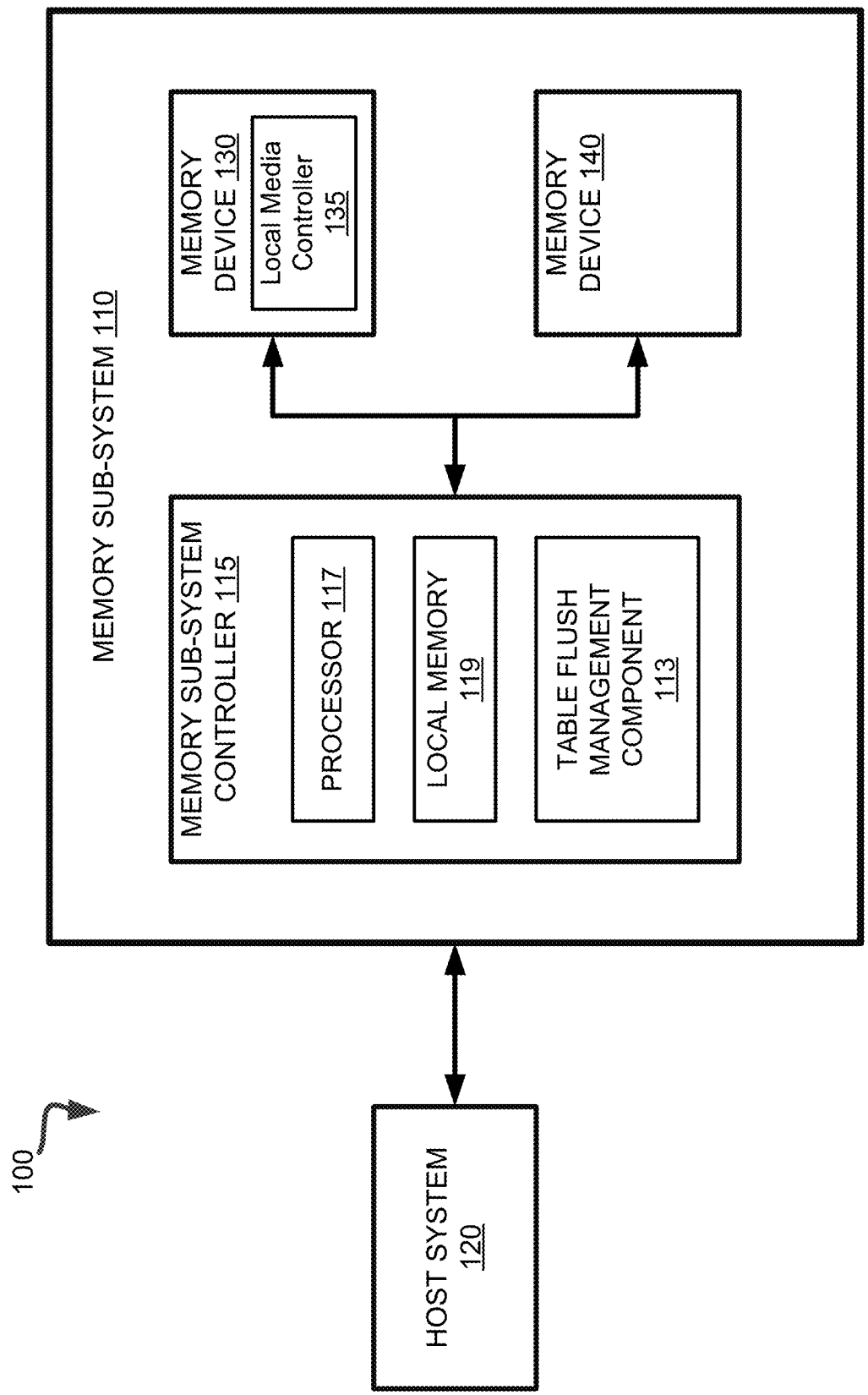
FIG. 1 illustrates an example computing system that includes a memory sub-system in accordance with some embodiments of the present disclosure.

Aspects of the present disclosure are directed to managing host input/output I/O during execution of a table flush command at a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more memory planes ("planes"). For some types of non-volatile memory devices (e.g., NAND devices), each plane consists of a set of physical blocks ("blocks"). Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional grid. The memory cells are etched onto a silicon wafer in an array of columns (also referred to as bitlines) and rows (also referred to as wordlines). A wordline can refer to one or more rows of memory cells of a memory device that are used with one or more bitlines to generate the address of each of the memory cells. The intersection of a bitline and wordline constitutes the address of the memory cell. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

For example, a memory device (e.g., NAND) of a memory sub-system (e.g., SSD) can be associated with a number of logical units (LUs) each providing a logical representation of a portion of the memory device (e.g., storage volume). Each LU is assigned a logical unit number (LUN) which is used by a host system to identify the LU when attached to the host system using a suitable interface standard. For example, a LUN can be associated with a plane of the memory device, and each plane can include a number of physical translation units (PTUs). A PTU corresponds to a base granularity of data managed by the memory device. In some examples, a given LUN can include 4 planes, and each of the planes can include 4 PTUs (e.g., 16 PTUs per LUN).

A memory sub-system controller ("controller") can be responsible for maintaining a logical-to-physical (L2P) mapping data structure (e.g., L2P mapping table) on volatile memory (e.g., SRAM). The L2P mapping table maintains, for a number of logical addresses, a one-to-one mapping to respective physical addresses. For example, in the case of NAND flash memory, a logical address can be a logical translation unit (LTU). The logical addresses can correspond to a number of contiguous physical addresses on the memory device (e.g., 16 LTUs, 32 LTUs, and 64 LTUs). In the case of NAND flash memory, the physical addresses can be referred to as flash physical addresses (FPAs). For example, if the L2P mapping data structure maintains 32 LTUs, the L2P mapping data structure can define mappings between $LTU_0$ through $LTU_{31}$ and respective ones of $FPA_0$ through $FPA_{31}$.

Upon receiving a data access request (e.g., read command and/or write command) from the host system designating a logical address (e.g., LTU), the logical address is translated into the corresponding physical address of the memory device (e.g., LUN, plane, PTU) to handle the data access request. To do so, a physical address translation (PAT) data structure (e.g., PAT table) can be maintained to manage the translations. For example, each physical address can correspond to one of the PTUs, which defines a physical location of the memory device with respect to a particular LUN and plane. If data is sequentially written to contiguous locations of the memory device, then consecutive LTUs can be present in the same block or page.

A volatile memory device only maintains data while it receives electric power, therefore, the L2P mapping data table maintained by the controller on the volatile memory device will be lost if the power is no longer supplied to the volatile memory device. To avoid losing the L2P mapping data table maintained on the volatile memory device, the memory sub-system can perform a memory flush operation. The memory flush operations reads the L2P mapping data table from the volatile memory device and writes the data corresponding to the L2P mapping data table to the non-volatile memory device. Thus, the memory flush operation involves memory read and write operations, which temporarily, until the memory flush operation is completed, suspend data access requests (e.g., read command and/or write command) received from the host system. Typically, memory flush operations can take a substantial amount of time to complete (e.g., 1 ms) and therefore increase the latency in processing data access request from the host system.

Aspects of the present disclosure address the above and other deficiencies by having a memory sub-system that performs a memory flush operation on a portion (e.g., 4 KB) of the L2P mapping data table and then allows for processing of data access requests from the host system. By performing memory flush operations on a single portion of the L2P mapping data table at any given time, the memory sub-system can process data access requests from the host system before proceeding with processing additional portions of the L2P mapping data table. The memory sub-system repeatedly switches from processing a single portion of the L2P mapping data table to processing at least one data access request until a total execution time of the at least one data access request (e.g., the sum of each of the execution time of the at least one data access request) exceeds a maximum execution time. Depending on the embodiment, the memory sub-system repeatedly switches from processing a single portion of the L2P mapping data table to processing a predetermined amount of data access request until a data access request threshold (e.g., a maximum number of data access request to be performed) is reached. The memory flush operation is complete once every portion of the L2P mapping data table has been written to the non-volatile memory device.

Advantages of the present disclosure include, but are not limited to, reducing the amount of latency to access request caused by table flush operations.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (SRAM) and synchronous dynamic random access memory (SSRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., SRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a table flush management component 113 that manages table flush operations and memory access request from the host system at memory devices 130, 140 during operation of memory sub-system 110. In some embodiments, the memory sub-system controller 115 includes at least a portion of the table flush management component 113. In some embodiments, the table flush management component 113 is part of the host system 110, an application, or an operating system. In other embodiments, local media controller 135 includes at least a portion of table flush management component 113 and is configured to perform the functionality described herein.

The table flush management component 113 manages table flush operations and memory access request from the host system at memory device 130, 140. For example, to manage table flush operations, responsive to receiving a table flush command, the table flush management component 113 performs a flush operation on a portion of the L2P mapping table (e.g., table) at any given time. Each portion of the table is a predefined portion of table to be flushed (e.g., 4 KB of the L2P mapping data table). Once the flush operation is performed on the portion, the table flush management component, responsive to receiving at least one memory access request (e.g., memory access command), suspends performing flush operation on other portions of the L2P mapping data table (e.g., table) and performs at least one memory access operations (e.g., read operation, write operation, or erase operation).

Depending on the embodiment, the table flush component 113 processes at least one memory access operation until a total execution time of the at least one memory access operation exceeds a maximum execution time (e.g., 1 ms). Each memory access operation correspond to a memory access command and the execution time of each of the memory access operation is based on the amount of data to be read or written. Depending on the embodiment, the table flush component 113 processes a predetermined number of memory access operations until a memory access operation threshold is reached. The memory access operation threshold refers to a maximum number of memory access operations that can be performed before returning to processing a table flush operation. Once the table flush component 113 performs the at least one memory access command, the table flush component 113 continues to perform flush operations on a subsequent portion of the L2P mapping table (e.g., another 4 KB of the L2P mapping data table). The table flush component 113 repeats this process until the flush command is complete. The table flush component 113 determines that the flush command is complete based on performing a flush operation on the last portion of the table. Further details with regards to the operations of the table flush management component 113 are described below.

Figure 2:
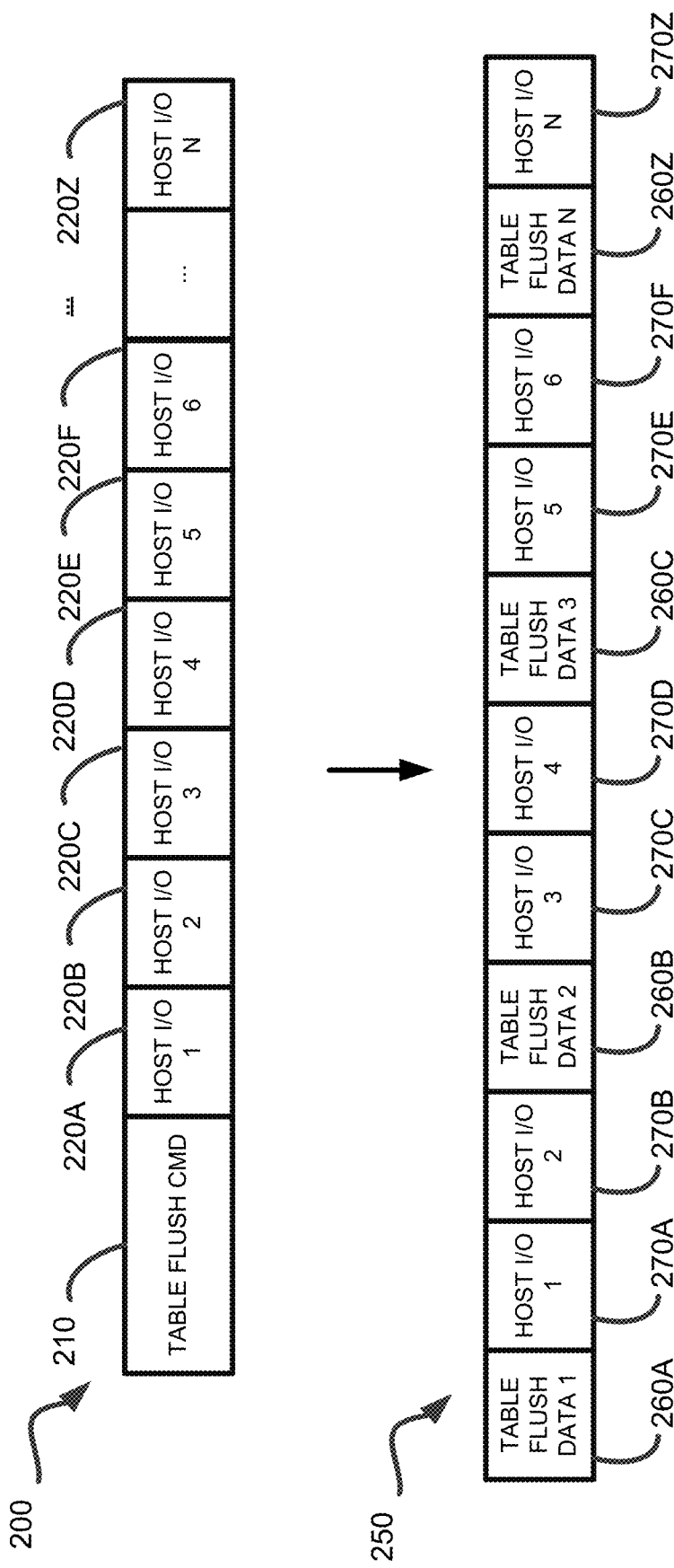
FIG. 2 illustrates managing host input/output (I/O) in a memory system executing a table flush command, in accordance with some embodiments of the present disclosure.

FIG. 2 illustrates managing host input/output (I/O) in a memory system executing a table flush command, in accordance with some embodiments of the present disclosure. Command queue 200 includes a table flush command 210 and a plurality of host I/O (e.g., memory access commands) 220A-Z. The table flush command 210 refers to a command to flush the L2P mapping data table from a volatile memory device to a non-volatile memory device. The plurality of memory access commands 220A-Z refers to a series of memory access commands received by the host system 120. Each memory access command (e.g., memory access command 220A) corresponds to a memory access operation (e.g., read operation, write operation, or erase operation). Based on the command queue 220, the table flush management component 113 manages performance of the operations corresponding to the table flush command 210 and the plurality of memory access commands 220A-Z. Accordingly, the table flush management component 113 reorganizes the order of operations in an operation queue 250 corresponding to the command queue 200.

The table flush management component 113, initially processes the table flush command 210 of the command queue 200 by performing a flush operation on a portion of the table flush data (e.g., L2P mapping data table) 260A, as shown in the operation queue 250. The table flush management component 113 selects the first portion (e.g., 4 KB) of the L2P mapping data table to perform a table flush operation. Once the flush operations is completed, the table flush management component 113 processes at least one memory access operation until a total execution time of the at least one memory access operation exceeds a maximum execution time (e.g., 1 ms). Each memory access operation of the plurality of memory access operations 270A-Z correspond to a memory access command of the plurality of memory access commands 220A-Z (e.g., memory access operation 270A corresponds to memory access command 220A). The execution time of each memory access operation is based on the amount of data to be read or written. For example, after the flush operation, only two memory access operations can be performed due to the total execution time of the two memory access operations exceeding the maximum execution time (e.g., 1 ms). Accordingly, the table flush management component 113 performs memory access operations 270A and 270B corresponding with memory access command 220A and 220B. The maximum execution time is configurable to allow enough execution time for the memory access operations to reduce latency in memory access commands received by the host system. In some embodiments, the maximum execution time may be determined by the amount of time it takes to perform a flush operation on a portion of the L2P mapping data table (e.g., 4 KB of the L2P mapping data table). Once, the table flush management component 113 has performed the memory access operations (e.g., 270A and 270B), the table flush management component 113 performs an additional flush operation on another portion of the table flush data 260B. The table flush management component 113 repeats alternating between performing flush operations on the remaining portions of the plurality of portions of the L2P mapping data table (e.g., portions 260C-Z) and performing memory access operations on the memory access operations (e.g., 270C and 270D, 270E and 270F, and so on until 270Z) until the flush operations is performed on the last portion of the plurality of portions of the L2P mapping data table.

Figure 3:
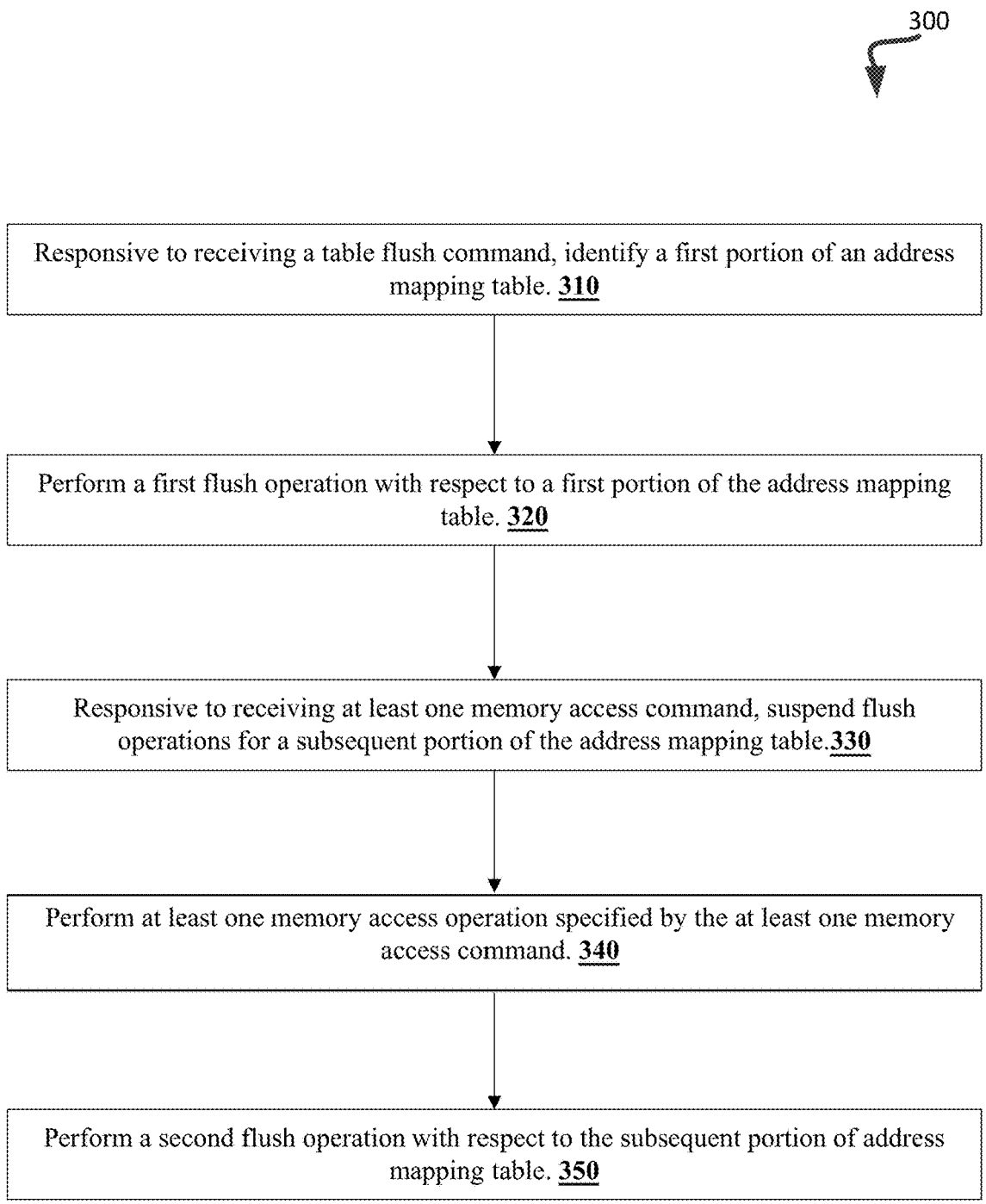
FIG. 3 is a flow diagram of an example method of managing host input/output (I/O) in a memory system executing a table flush command, in accordance with some embodiments of the present disclosure.

FIG. 3 is a flow diagram of an example method 300 to manage host input/output (I/O) in a memory system executing a table flush command, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the table flush management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, responsive to receiving a table flush command, the processing logic identifies a first portion of an address mapping table. Each portion of the address mapping table is a predetermined size (e.g., the size of a data unit 4 KB). For example, the first portion of the address mapping table and the subsequent portion of the address mapping table is the predetermined data size.

At operation 320, the processing logic performs a first flush operation with respect to a first portion of the address mapping table. To perform the first flush operation, the processing logic reads the first portion of the address mapping table from a volatile memory device and writes the first portion of the address mapping table to a non-volatile memory device. At operation 330, responsive to receiving at least one memory access command, the processing logic suspends flush operations for a subsequent portion of the address mapping table.

At operation 340, the processing logic performs at least one memory access operation specified by the at least one memory access command. As described previously, the memory access operation specified by the memory access command can be one of: a write operation, a read operation, and an erase operation. While performing the at least one memory access operation specified by the at least one memory access command, the processing logic performs the at least one memory access operation until a total execution time of the at least one memory access operation (e.g., the sum of each of the execution time of the at least one memory access operation) exceeds a maximum execution time. The maximum execution time (e.g., 1 ms) is based on an amount of time it takes to perform a flush operation on a predetermined portion of the address mapping table (e.g., 1 ms to perform a flush operation on 4 KB of the address mapping table).

At operation 350, the processing logic performs a second flush operation with respect to the subsequent portion of the address mapping table. Depending on the embodiments, the processing logic determines whether there are any portions left in the address mapping table. Upon determining that there are no portions left in the address mapping table, the processing logic indicates that the table flush is complete and performs subsequent memory access operations specified by the subsequent memory access command until a subsequent table flush command is received.

Figure 4:
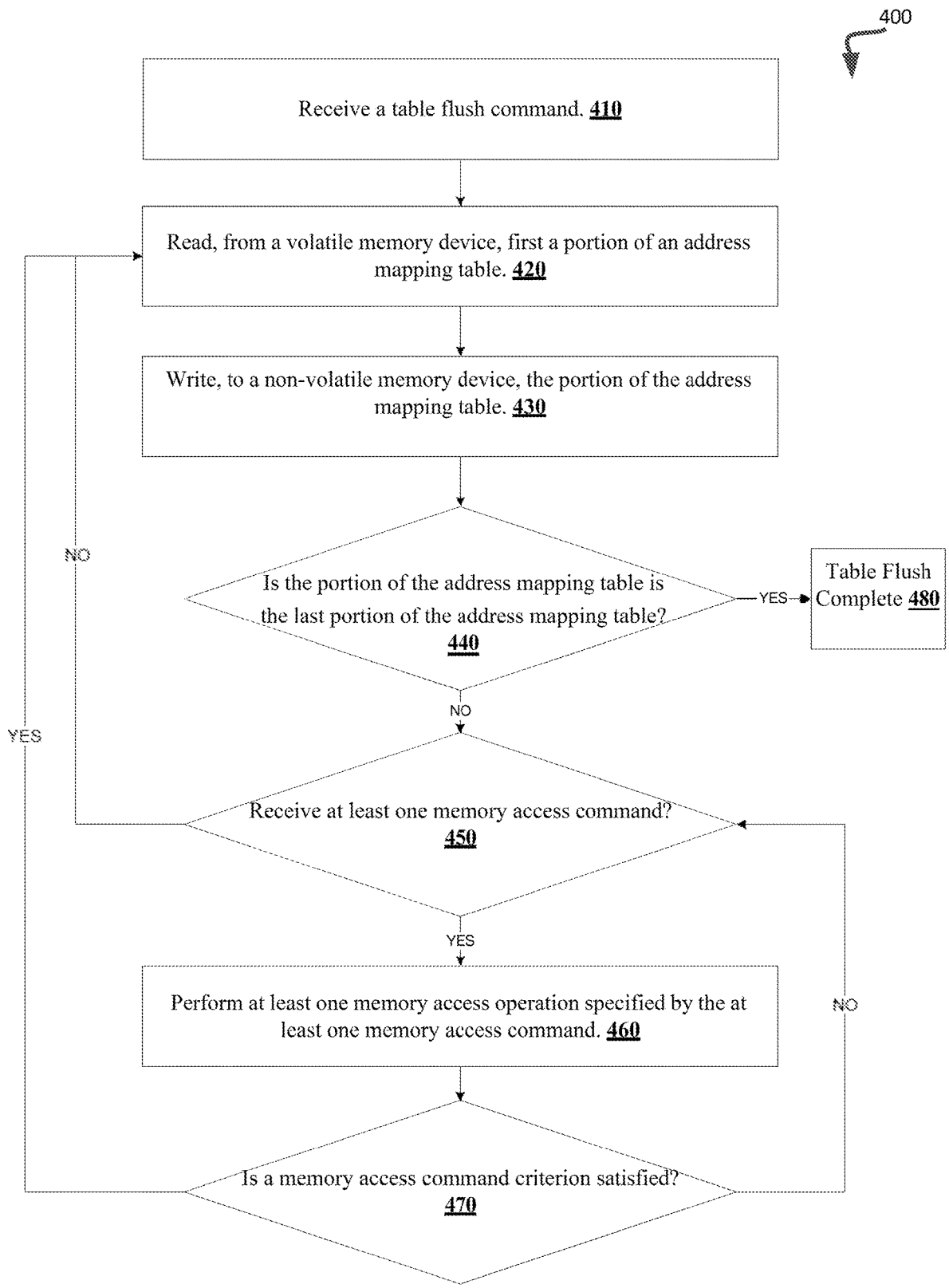
FIG. 4 is a flow diagram of another example method of managing host input/output (I/O) in a memory system executing a table flush command, in accordance with some embodiments of the present disclosure.

FIG. 4 is a flow diagram of an example method 400 to manage host input/output (I/O) in a memory system executing a table flush command, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the table flush management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives a table flush command. As described previously, responsive to receiving a table flush command, the processing logic identifies a portion of an address mapping table.

At operation 420, the processing logic reads, from a volatile memory device, first the portion of an address mapping table. Each portion of the address mapping table is a predetermined size (e.g., the size of a data unit 4 KB). For example, the portion of the address mapping table and subsequent portions of the address mapping table is the predetermined data size. At operation 430, the processing logic writes, to a non-volatile memory device, the portion of the address mapping table.

At operation 440, the processing logic determines whether the portion of the address mapping table is the last portion of the address mapping table. In some embodiments, if the portion of the address mapping table is the last portion of the address mapping table, the processing logic proceeds to operation 480. At operation 480, the processing logic indicates that the table flush command is complete.

Subsequently, and/or simultaneously, at operation 450, the processing logic receives at least one memory access command. As described previously, the memory access operation specified by the memory access command can be one of: a write operation, a read operation, and an erase operation. In some embodiments, if no memory access commands are received, the processing logic proceeds to operation 420.

At operation 460, responsive to determining that the portion is not the last portion of the address mapping table, the processing logic performs at least one memory access operation specified by the at least one memory access command.

At operation 470, the processing logic determines whether a memory access command criterion is satisfied. To determine whether the memory access command criterion is satisfied, the processing logic determines whether a total execution time of the at least one memory access operation exceeds a maximum execution time. As described previously, the maximum execution time (e.g., 1 ms) is based on an amount of time it takes to perform a flush operation on a predetermined portion of the address mapping table (e.g., 1 ms to perform a flush operation on 4 KB of the address mapping table).

Figure 5:
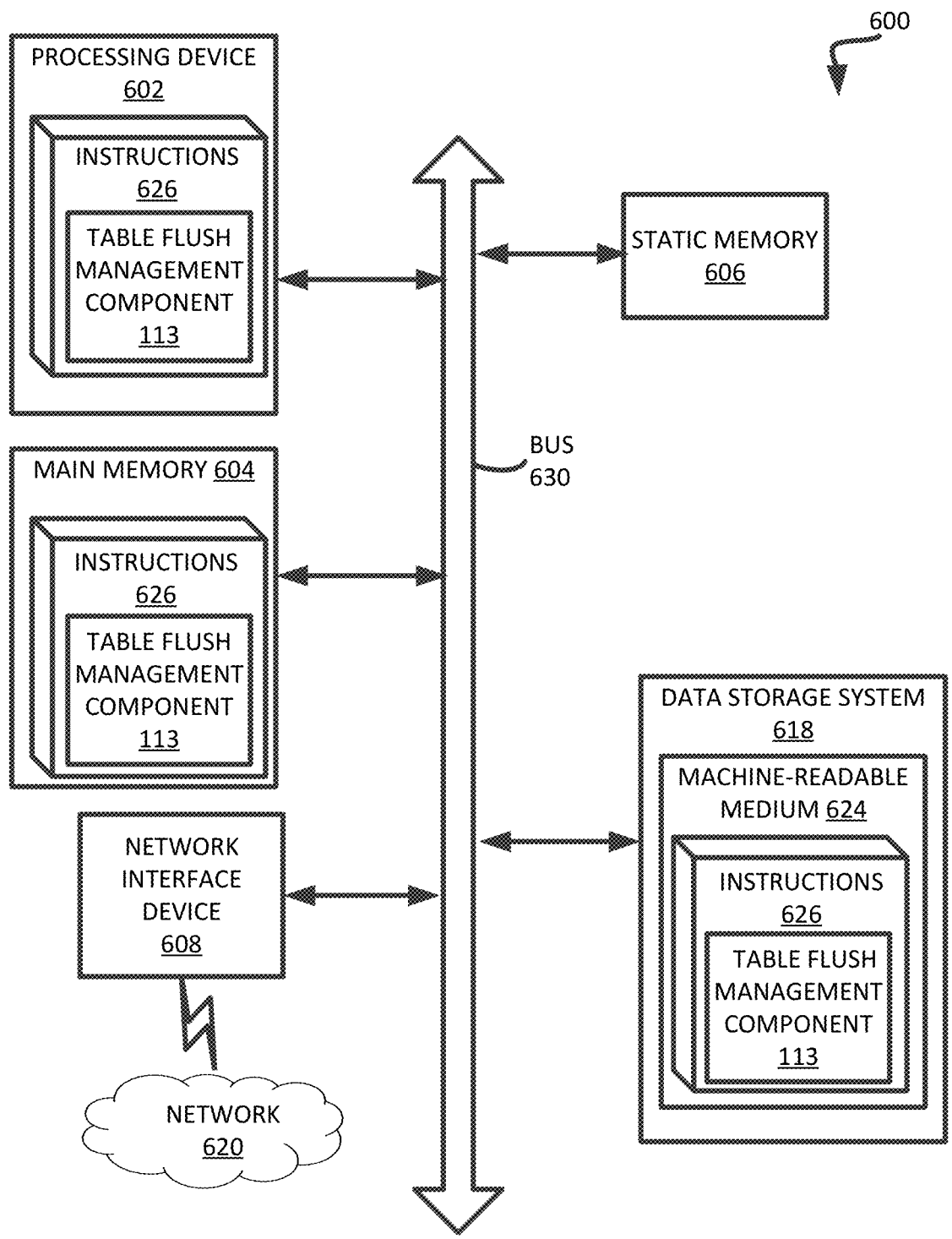
FIG. 5 is a block diagram of an example computer system in which embodiments of the present disclosure may operate.

FIG. 5 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the table flush management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (SRAM) such as synchronous SRAM (SSRAM) or RSRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a media management component (e.g., the table flush management component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    responsive to receiving a table flush command, performing a flush operation on the address mapping table;
    responsive to receiving at least one memory access command, suspending the flush operation after a predefined portion of the address mapping table is flushed;
    performing at least one memory access operation specified by the at least one memory access command; and
    resuming the performance of the flush operation on the address mapping table.

2. The method of claim 1, wherein performing the flush operation includes reading the address mapping table from a volatile memory device and writing the address mapping table to a non-volatile memory device.

3. The method of claim 1, wherein the memory access operation specified by the memory access command includes one of: a write operation, a read operation, or an erase operation.

4. The method of claim 1, wherein performing the at least one memory access operation specified by the at least one memory access command includes performing the at least one memory access operation until a total execution time of the at least one memory access operation exceeds a maximum execution time.

5. The method of claim 4, wherein the maximum execution time is based on an amount of time it takes to perform a flush operation on a predefined portion of the address mapping table.

6. The method of claim 1, wherein the predefined portion of the address mapping table is a predetermined data size.

7. The method of claim 6, wherein the predetermined data size is a size of a data unit.

8. The method of claim 7, further comprising:
responsive to receiving a subsequent memory access command, suspending the flush operation after a second predefined portion of the address mapping table is flushed;
performing a subsequent memory access operations specified by the subsequent memory access command; and
resuming the performance of the flush operation on the address mapping table.

9. A non-transitory computer-readable storage medium comprising instructions that, when executed by a processing device, cause the processing device to perform operations comprising:
receiving a table flush command;
reading, from a volatile memory device, a predefined portion of an address mapping table;
writing, to a non-volatile memory device, the predefined portion of the address mapping table;
receiving at least one memory access command;
responsive to determining that the predefined portion is not the last portion of the address mapping table, performing at least one memory access operation specified by the at least one memory access command; and
determining whether a memory access command criterion is satisfied.

10. The non-transitory computer-readable storage medium of claim 9, wherein determining whether the memory access command criterion is satisfied includes determining whether a total execution time of the at least one memory access operation exceeds a maximum execution time.

11. The non-transitory computer-readable storage medium of claim 10, wherein the maximum execution time is based on an amount of time it takes to perform a flush operation on a predefined portion of the address mapping table.

12. The non-transitory computer-readable storage medium of claim 9, wherein the predefined portion of the address mapping table is a predetermined data size.

13. A system comprising:
one or more memory devices; and
a processing device, coupled to the one or more memory devices, to perform operations comprising:
responsive to receiving a table flush command, performing a flush operation on the address mapping table;
responsive to receiving at least one memory access command, suspending the flush operation after a predefined portion of the address mapping table is flushed;
performing at least one memory access operation specified by the at least one memory access command; and
resuming the performance of the flush operation on the address mapping table.

14. The system of claim 13, wherein performing the flush operation includes reading the address mapping table from a volatile memory device and writing the address mapping table to a non-volatile memory device.

15. The system of claim 13, wherein the memory access operation specified by the memory access command includes one of: a write operation, a read operation, or an erase operation.

16. The system of claim 13, wherein performing the at least one memory access operation specified by the at least one memory access command includes performing the at least one memory access operation until a total execution time of the at least one memory access operation exceeds a maximum execution time.

17. The system of claim 16, wherein the maximum execution time is based on an amount of time it takes to perform a flush operation on a predefined portion of the address mapping table.

18. The system of claim 13, wherein the predefined portion of the address mapping table is a predetermined data size.

19. The system of claim 18, wherein the predetermined data size is a size of a data unit.

20. The system of claim 13, wherein the operations further comprise:
responsive to receiving a subsequent memory access command, suspending the flush operation after a second predefined portion of the address mapping table is flushed;
performing a subsequent memory access operations specified by the subsequent memory access command; and
resuming the performance of the flush operation on the address mapping table.

* * * * *